UNITED STATES PATENT OFFICE.

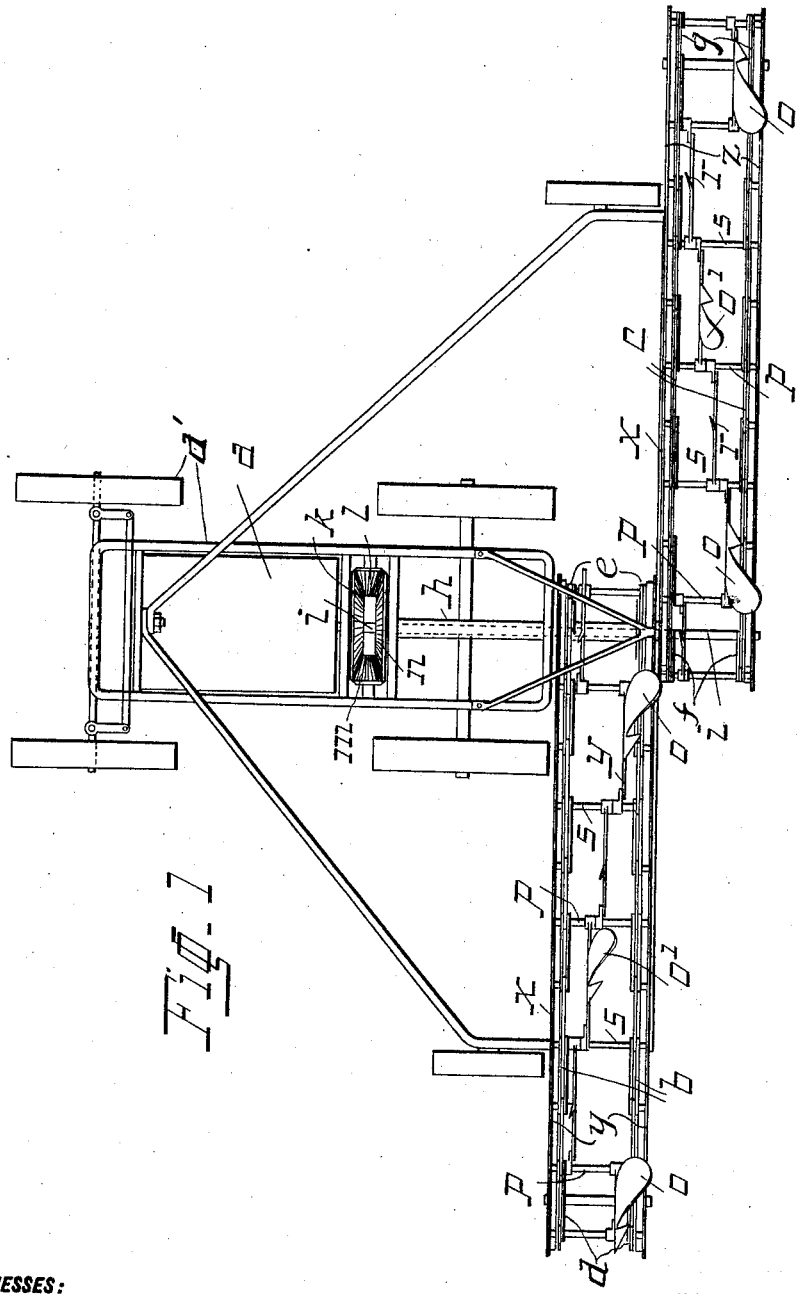

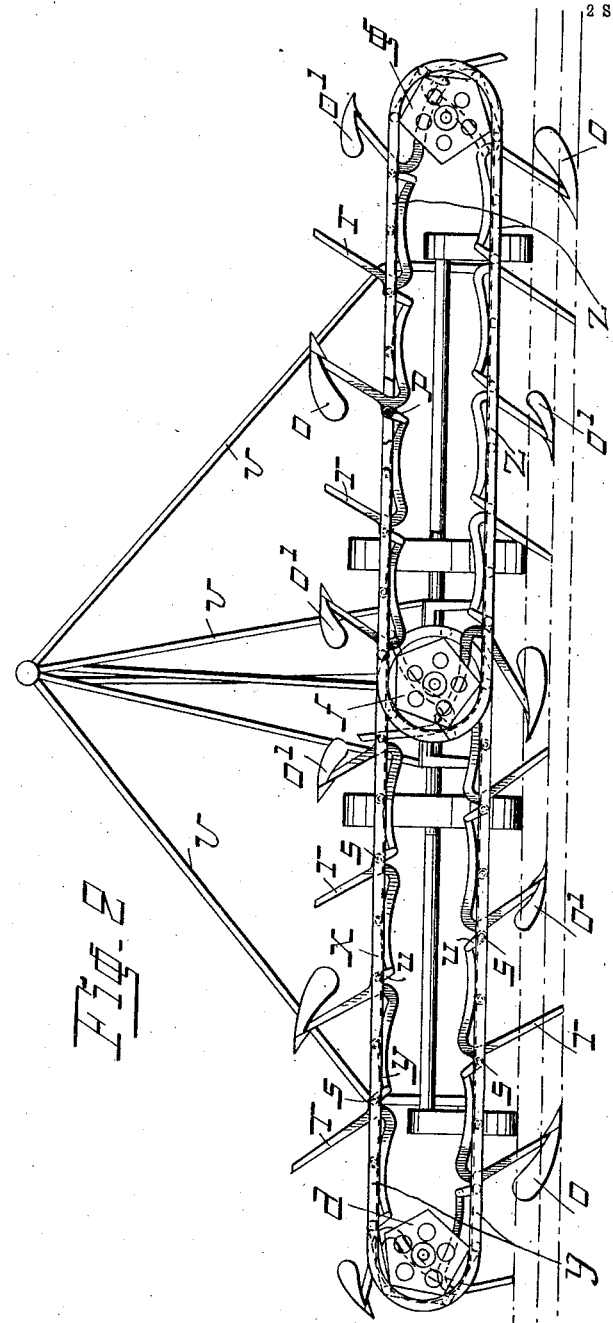

CARL ARVID ANDERSSON, OF BRONÄS, SWEDEN.

PLOW.

1,050,711.  Specification of Letters Patent.  Patented Jan. 14, 1913.

Application filed January 13, 1911. Serial No. 602,411.

*To all whom it may concern:*

Be it known that I, CARL ARVID ANDERSSON, a subject of the King of Sweden, residing at Bronäs, Sweden, have invented certain new and useful Improvements in Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention is a power plow comprising, in its perferred construction, two oppositely working sets of plow shares and knives or colters carried by endless chains, driving belts or the like running over wheels driven from a portable engine, the engine acting through driving shafts one of which revolves within the other to operate the two systems in a simple and convenient manner.

In the accompanying drawings, Figure 1 represents a diagrammatic plan view of mechanism embodying my invention, and Fig. 2 is an end elevation of the same.

The mechanism, as illustrated in the drawings, comprises a motor $a$ mounted on a truck $a'$ and adapted for driving two pairs of endless chains or link belts $b$ and $c$ which are carried by the respective wheels $d$, $e$, and $f$, $g$. The wheels $e$ are fixed on a hollow shaft $h$ and the wheels $f$ are fixed on a shaft $i$, which passes through the shaft $h$. The shaft $i$, which is directly connected with and driven by the motor $a$, has fixed thereon a beveled gear $k$ which acts through beveled pinions $l$ and $m$ on a beveled gear $n$ fixed on the shaft $h$, whereby the latter is driven.

Each of the belts $b$ and $c$ carries plow shares $o$, $o'$, of usual character, placed at suitable distances apart, the shares being secured to transverse bolts $p$ pivotally connected to the members $b$ and $c$. In front of each plow share is disposed a colter $r$ of usual character, the colters being fixed to transverse bolts or pivots $s$ carried by the respective belts. As, by the mechanism described, the belts are driven in opposite directions, the shares and colters carried by one belt travel through the ground toward the shares and colters moved through the ground by the other belt.

The wheels $d$, $e$, and $f$, $g$, which carry the belts $b$ and $c$, are respectively journaled in frames $y$ and $z$ supported at their inner ends by and adapted to be turned on the respective shafts $h$ and $i$, whereby each unit or system, comprising a frame with the wheels, belts, shares and colters carried thereby, can be elevated and lowered.

The frames $y$ and $z$ are supported by lifting devices $u$ so that they can be adjusted to the proper elevation for plowing or hoisted clear of the ground when the position of the motor is to be changed. As it is not desired to claim particular elevating devices in this application, they are not shown or described in detail.

It will be understood that the term "belt" is used in its generic sense and includes any form of link belt, sprocket chains or the like.

Having described my invention, I claim:

1. A power plow comprising a truck, a motor mounted on said truck, a pair of shafts, one of said shafts being hollow and inclosing the other, gearing connecting said shafts, one of said shafts being driven by said motor, a pair of frames adapted to be moved vertically on an axle substantially coincident with the axis of said shafts, a set of wheels carried by each of said frames and operated by the respective shafts, a belt operated by each of the respective sets of wheels, and plow shares carried by the respective belts.

2. A power plow comprising a truck, a motor mounted on said truck, a shaft driven by said motor and having a gear thereon, a hollow shaft having a gear thereon, said first named shaft passing through said hollow shaft, a pinion connecting said gears, a pair of frames adapted to be moved vertically on an axis substantially coincident with the axis of said shafts, a set of wheels carried by each of said frames and operated by the respective shafts, a belt operated by each of the respective sets of wheels, and plow shares carried by the respective belts.

In testimony, that I claim the foregoing as my invention, I have signed my name in presence of two subscribing witnesses.

CARL ARVID ANDERSSON.

Witnesses:
E. L. WEOMERSTEN,
A. M. BERGGREN.

---

Copies of this patent may be obtained for five cents each, by addressing the "Commissioner of Patents, Washington, D. C."